United States Patent
Dao et al.

[19]
[11] Patent Number: 5,991,863
[45] Date of Patent: Nov. 23, 1999

[54] SINGLE CARRY/BORROW PROPAGATE ADDER/DECREMENTER FOR GENERATING REGISTER STACK ADDRESSES IN A MICROPROCESSOR

[75] Inventors: Tuan Q. Dao; Debjit Das Sarma; Duc Q. Bui, all of Dallas, Tex.

[73] Assignee: Texas Instruments Incorporated, Dallas, Tex.

[21] Appl. No.: 08/920,729

[22] Filed: Aug. 29, 1997

Related U.S. Application Data

[60] Provisional application No. 60/024,984, Aug. 30, 1996.

[51] Int. Cl.$^6$ .............................. G06F 12/00; G06F 7/42; G11C 8/00
[52] U.S. Cl. .......................... 711/219; 711/211; 711/220; 708/708; 708/710
[58] Field of Search ..................................... 711/219, 211, 711/220, 214, 169; 708/708, 710, 714, 670, 707

[56] References Cited

U.S. PATENT DOCUMENTS

| | | | |
|---|---|---|---|
| 4,974,188 | 11/1990 | Dolecek | 708/710 |
| 5,257,218 | 10/1993 | Poon | 708/710 |
| 5,351,207 | 9/1994 | Girard et al. | 708/706 |
| 5,583,806 | 12/1996 | Widigen et al. | 708/706 |
| 5,724,540 | 3/1998 | Kametani | 711/219 |
| 5,765,218 | 6/1998 | Ozawa et al. | 711/219 |

*Primary Examiner*—Glenn Gossage
*Attorney, Agent, or Firm*—Rebecca Mapstone Lake; Richard L. Donaldson

[57] ABSTRACT

A microprocessor (10) and system implementing the same is disclosed, in which stack-based register address calculation is performed in a single add cycle for instructions involving a PUSH operation. The microprocessor (10) includes a floating-point unit (FPU) (31) having a register stack ($52_{ST}$) and a stack pointer (FSP), for executing floating-point instructions containing relative register addresses (REG) based upon the contents (TOP) of the stack pointer (FSP). The instructions may involve PUSH operations, in which an operand is added to the stack of operands in the register stack ($52_{ST}$). Register addressing circuitry (125, 125') includes an adder (122; 122') for generating the sum of the contents (TOP) of the stack pointer (FSP) and the relative register address (REG) of the instruction, and an adder/decrementer (120) for generating the sum of the contents (TOP) of the stack pointer (FSP) and the relative register address (REG) of the instruction minus one, to account for the PUSH. The adder (122; 122') and adder/decrementer (120) have their outputs coupled to a multiplexer (124) which is controlled according to whether or not the current instruction involves a PUSH operation. For the case where the contents (TOP) of the stack pointer (FSP) and the relative register address (REG), as well as the raw calculated register address, are each three-bit binary values, the adder/decrementer (120) may be constructed to perform the addition and subtraction of one with a single carry/borrow propagate add.

22 Claims, 6 Drawing Sheets

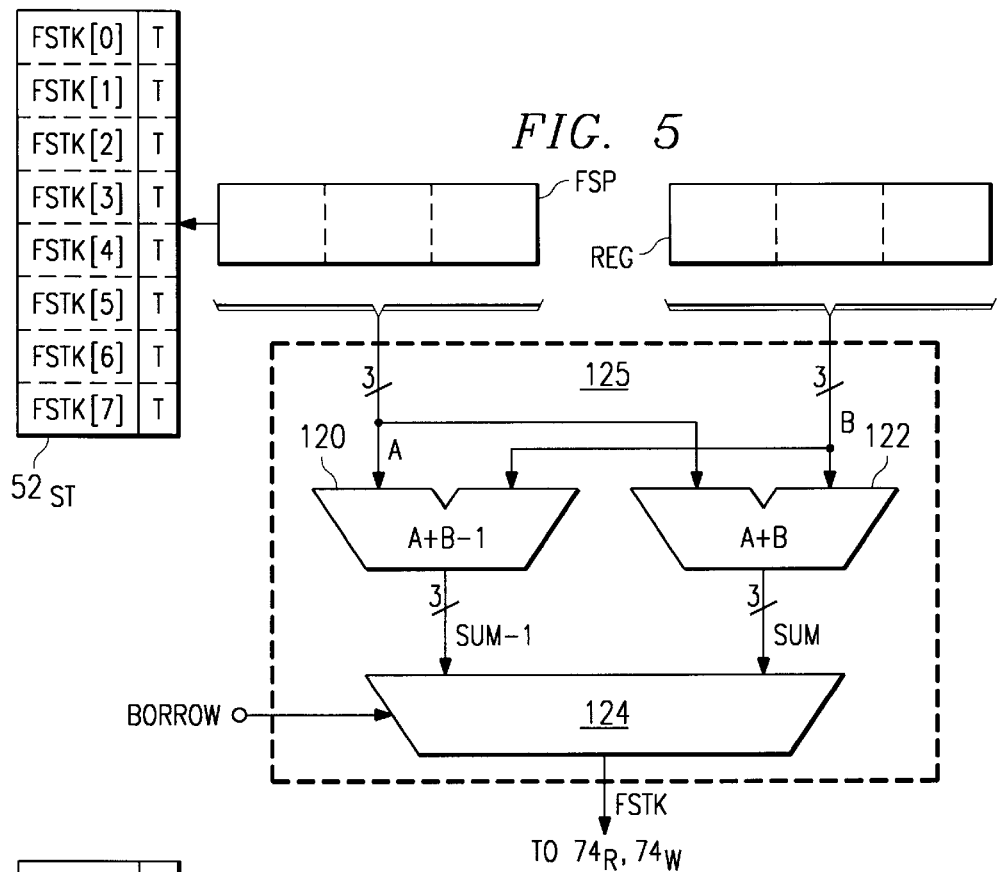
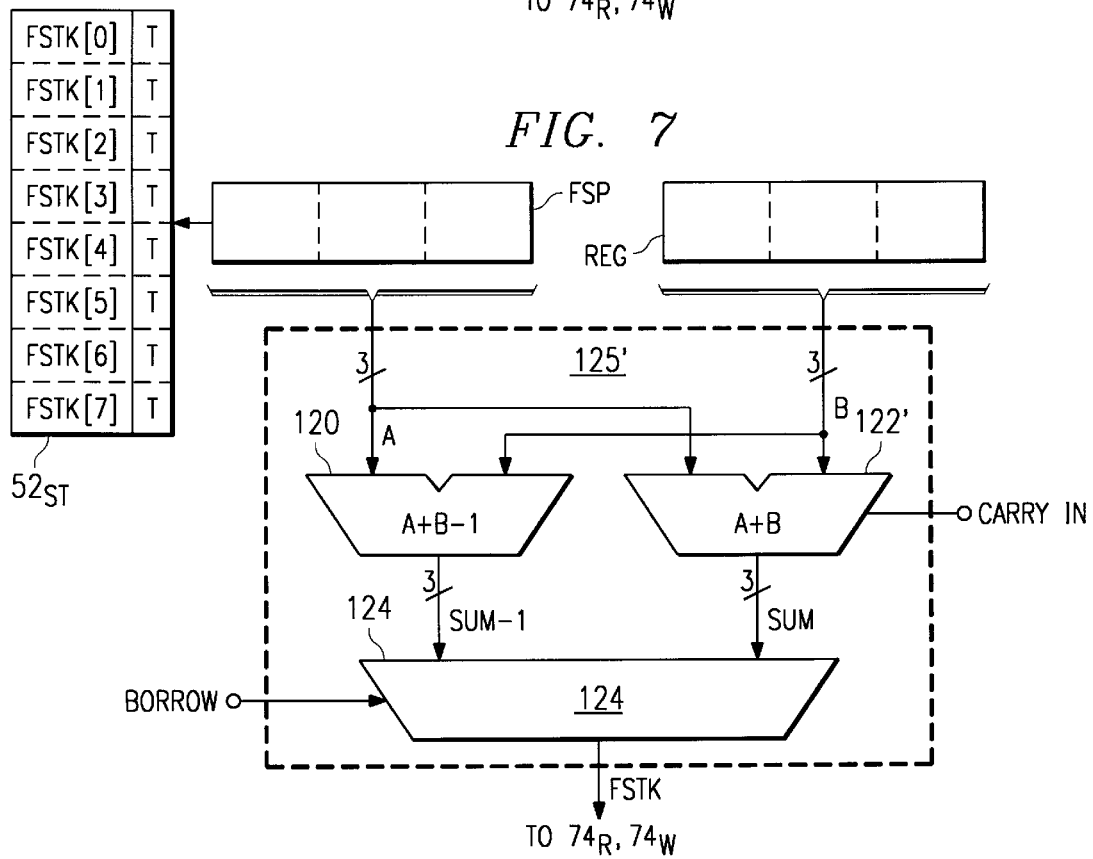

SINGLE CARRY/BORROW PROPAGATE ADDER/DECREMENTER FOR GENERATING REGISTER STACK ADDRESSES IN A MICROPROCESSOR

This application claims the benefit of U.S. Provisional Application No. 60/024,984, filed Aug. 30, 1996.

This invention is in the field of microprocessor architecture, and is more specifically directed to logic for generating register addresses in microprocessors.

BACKGROUND OF THE INVENTION

In the field of microprocessors, the way in which registers are addressed and accessed in retrieving or storing operands during the execution of an instruction is a distinguishing feature of the microprocessor architecture. For example, instructions executed by microprocessors of the accumulator architecture implicitly refer to an operand stored in the accumulator. In general-purpose register architecture microprocessors, both memory and register operands are explicitly addressed in the instructions. In microprocessors of the load/store register architecture, which has been widely adopted in recent years, register operands are directly addressed in the instructions, and memory operands are accessed only by execution of load and store instructions.

Another well-known microprocessor architecture is referred to as the stack architecture. In the stack architecture, as is well-known, operands are implicitly stored in an ordered sequence within a group of registers referred to as a stack. A separate register, referred to as a stack pointer, stores an address corresponding to the stack register from or to which the next instruction is to fetch or store an operand. Operations referred to as PUSH and POP are respectively used to store operands into, and retrieve operands from, the stack; the stack pointer is incremented or decremented accordingly. In modern microprocessors, stack architectures are used primarily for internal execution units, rather than for the main instruction pipelines. For example, modern microprocessors of the x86-architecture type commonly utilize stack architecture in their on-chip floating-point units (FPUs), while the main, or integer, pipelines are of load/store architecture.

In stack architecture processors, actual (raw) register addresses must be calculated for each instruction that involves an operand store or fetch from the stack. For example, a typical floating-point instruction in an x86-architecture microprocessor involves the calculation of a register address based upon the current stack pointer value (referred to in this architecture as the top-of-stack value TOP) and upon an explicit register address indicated in the instruction; the register address in the instruction is typically an offset address relative to the top-of-stack value TOP. The execution of certain instructions may also involve a PUSH operation, in which an operand is stored in the next register above the top of the stack. As is known in the art, a PUSH operation involves the pre-decrementing of the stack pointer, followed by the storage of the operand in the new pointed-to location; conversely, a POP operation involves the read of an operand from the top of the stack, followed by incrementing of the stack pointer.

Because the floating-point units in typical x86-architecture microprocessors of the so-called P5 or P6 class are pipelined, register address calculation must be performed prior to execution, for example in an instruction schedule stage of the pipeline. This early register mapping is necessary in order to detect register conflicts and dependencies that may arise from the multiple instructions in the pipeline. Especially in the case of floating-point instruction execution, therefore, the calculation of register addresses for instructions involving PUSH operations is performed for a high percentage of the executed instructions. The time required for calculation of register addresses affects the overall performance of the unit.

It is therefore desirable to calculate raw register addresses as rapidly as possible. Of course, as is well known in the art, the addition of two binary numbers, either with or without a carry-in bit, may be done by a simple single carry-propagate adder. Accordingly, in a stack architecture, the calculation of a register address by the addition of the stack pointer contents and a relative register address may be performed with a single add. However, the calculation of a register address for an instruction involving a PUSH operation requires both adding the stack pointer contents to the relative register address indicated in the instruction, and also subtracting one to account for the PUSH. As is well known in the art, however, subtraction of one may not be performed in combination with a sum operation in a conventional single carry-propagate adder, but instead requires a second carry-propagate addition of minus one (i.e., 2's complement of $1_2$) to the previous sum. The necessity for two carry-propagate adds to calculate register addresses has been observed to affect a large number of operations, particularly in modern pipelined floating-point sequences, and, since this calculation is in the critical performance path, limits the overall microprocessor performance.

SUMMARY OF THE INVENTION

The present invention may be implemented into a stack architecture processor, such as an on-chip floating-point unit in an x86-architecture microprocessor, in control circuitry for calculating raw, or actual, register addresses. In the case where the register addresses are three bits, a first single carry/borrow propagate adder may be implemented in which a borrow-in value is presumed and in which the carry-out from the most significant bit is ignored. This first adder is placed in parallel with a second adder in which no borrow-in is provided; the outputs of the first and second adders are presented to a multiplexer that is controlled according to whether or not the present instruction incorporates a PUSH to the stack.

It is an object of the present invention to provide a microprocessor in which register address calculations for instructions requiring a stack PUSH may be performed with a single carry/borrow propagate addition.

It is a further object of the present invention to provide such a microprocessor which provides flexibility in the generation of register addresses among various instructions, including those requiring and not requiring a PUSH operation.

It is a further object of the present invention to provide such capability to a floating-point unit within a microprocessor.

Other objects and advantages of the present invention will be apparent to those of ordinary skill in the art having reference to the following specification together with its drawings.

BRIEF DESCRIPTION OF THE DRAWINGS

FIG. 5 is an electrical diagram, in block form, of the register addressing circuitry in the map logic of the scheduler of FIG. 4 according to a first preferred embodiment of the invention.

FIG. 7 is an electrical diagram, in block form, of the register addressing circuitry in the map logic of the scheduler of FIG. 4 according to an alternative embodiment of the invention.

DETAILED DESCRIPTION OF THE PREFERRED EMBODIMENT

Figure 1:
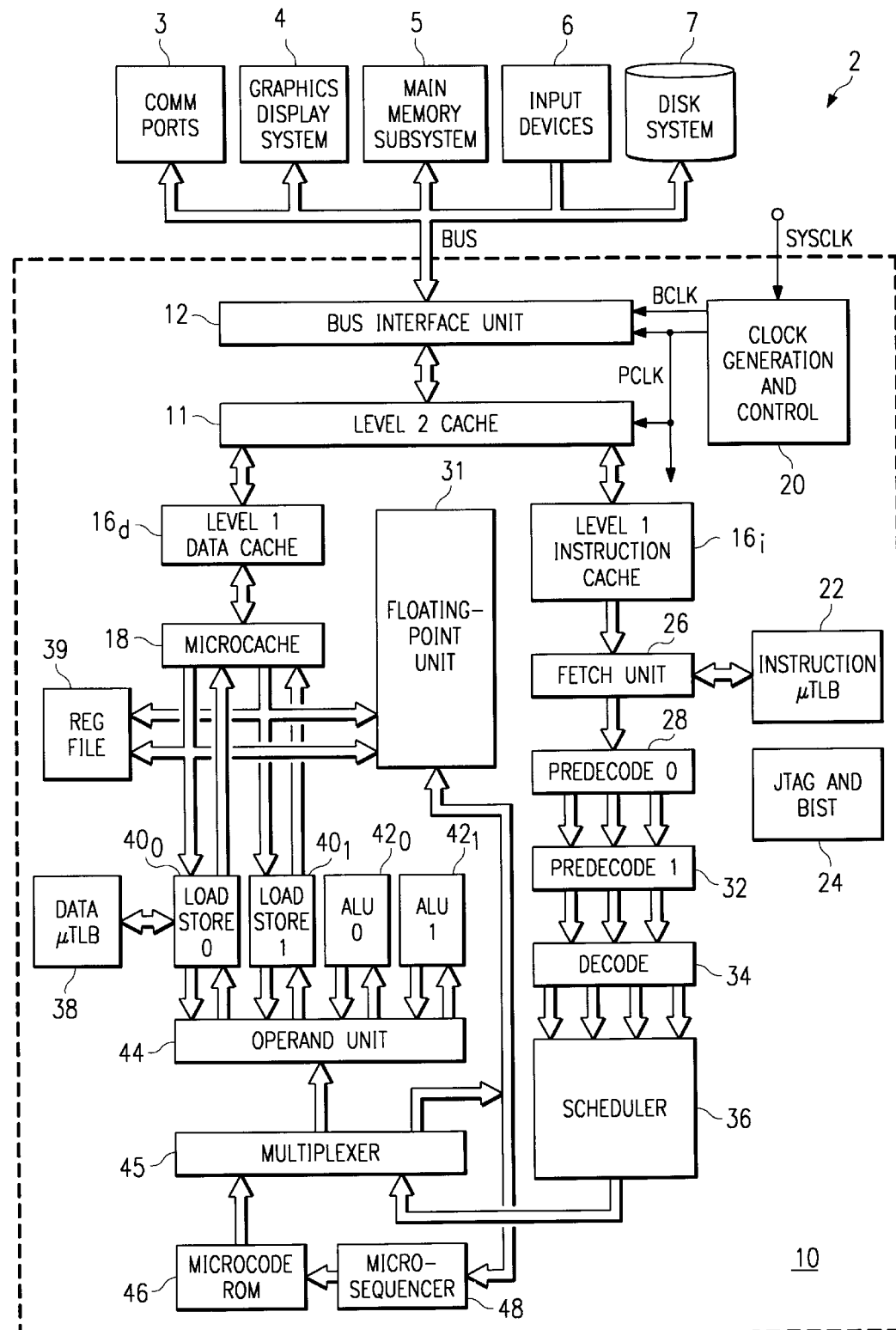
FIG. 1 is an electrical diagram, in block form, of a microprocessor and system constructed according to the preferred embodiment of the invention.

Referring to FIG. 1, an exemplary data processing system 2, including an exemplary superscalar pipelined microprocessor 10 constructed according to the preferred embodiment of the invention, will now be described. It is to be understood that the architecture of system 2 and of microprocessor 10 is described herein by way of example only, as it is contemplated that the present invention may be utilized in microprocessors and systems of various architectures. It is therefore contemplated that one of ordinary skill in the art, having reference to this specification, will be readily able to implement the present invention in such other microprocessor architectures. It is further contemplated that the present invention may be realized in single-chip microprocessors and microcomputers or in multiple-chip implementations, with the manufacture of such integrated circuits accomplished according to silicon substrate, silicon-on-insulator, gallium arsenide, and other manufacturing technologies, and using Metal Oxide Seimiconductor (MOS), Complementary Metal Oxide Semeicoductor (CMOS), bipolar, Bipolar/Complementary Menta Oxide Semicoductor, BiCMOS or other device implementations.

Microprocessor 10, as shown in FIG. 1, is connected to other system devices by way of external bus BUS. While external bus BUS is shown as a single bus in this example, it is of course contemplated that external bus BUS may represent multiple buses having different speeds and protocols, for example as is known in conventional computers utilizing the Peripheral Component Interconnect (PCI) local bus architecture. System 2 contains such conventional subsystems as communication (COMM) ports 3 (including modem ports and modems, network interfaces, and the like), graphics display subsystem 4 (including video memory, video processors, a graphics monitor), main memory system 5 which is typically implemented by way of dynamic random access memory (DRAM), input devices 6 (including a keyboard, a pointing device, and the interface circuitry therefor), and disk system 7 (which may include hard disk drives, floppy disk drives, and CD-ROM drives). It is therefore contemplated that system 2 of FIG. 1 corresponds to a conventional desktop computer or workstation, as are now common in the art. Of course, other system implementations of microprocessor 10 can also benefit from the present invention, as will be recognized by those of ordinary skill in the art.

Microprocessor 10 includes bus interface unit (BIU) 12, which is connected to external bus BUS and which controls and effects communication between microprocessor 10 and the external elements in system 2. BIU 12 includes the appropriate control and clock circuitry to perform this function, including write buffers for increasing the speed of operation, and timing circuitry so as to synchronize the results of internal microprocessor operation with bus BUS timing constraints. Microprocessor 10 also includes clock generation and control circuitry 20 which generates clock phases based upon system clock SYSCLK; in this example, clock generation and control circuitry 20 generates bus clock BCLK which is the controlling clock signal for bus operations upon external bus BUS, and core clock PCLK which is the controlling clock signal for internal operation of microprocessor 10.

As is evident in FIG. 1, microprocessor 10 has three levels of internal cache memory, with the highest of these as level 2 cache 11, which is connected to BIU 12 by way of an internal bus. In this example, level 2 cache 11 is a unified cache, and is configured to receive all cacheable data and cacheable instructions from bus BUS via BIU 12, such that much of the bus traffic presented by microprocessor 10 is accomplished via level 2 cache 11. Of course, microprocessor 10 may also effect bus traffic around cache 11, by treating certain bus reads and writes as "not cacheable". Level 2 cache 11, as shown in FIG. 1, is connected to two level 1 caches 16; level 1 data cache $16_d$ is dedicated to data, while level 1 instruction cache $16_i$ is dedicated to instructions. Microcache 18 is a fully dual-ported level 0 data cache, in this example.

As shown in FIG. 1, microprocessor 10 is of the superscalar type, and thus includes multiple execution units. These execution units include two Arithmetic and Logic Unit (ALU) $42_0$, $42_1$, for processing conditional branch, integer, and logical operations, floating-point unit (FPU) 31, two load-store units $40_0$, $40_1$, and microsequencer 48. The two load-store units 40 utilize the two ports to microcache 18, for true parallel access thereto, and also perform load and store operations to registers in register file 39. Data microtranslation lookaside buffer ($\mu$TLB) 38 is provided to translate logical data addresses into physical addresses, in a conventional manner.

These multiple execution units are controlled by way of multiple pipelines of seven stages each, with write-back. The pipeline stages are as follows:

| | |
|---|---|
| F | Fetch: This stage generates the instruction address and reads the instruction from the instruction cache or memory |
| PD0 | Predecode stage 0: This stage determines the length and starting position of up to three fetched x86-type instructions |
| PD1 | Predecode stage 1: This stage extracts the x86 instruction bytes and recodes them into fixed length format for decode |
| DC | Decode: This stage translates the x86 instructions into atomic operations (AOps) |
| SC | Schedule: This stage assigns up to four AOps to the appropriate execution units (including FPU 31) |
| OP | Operand: This stage retrieves the register operands indicated by the AOps |

-continued

| | |
|---|---|
| EX | Execute: This stage runs the execution units according to the AOps and the retrieved operands |
| WB | Write-back: This stage stores the results of the execution in registers or in memory |

Referring back to FIG. 1, the pipeline stages noted above are performed by various functional blocks within microprocessor 10. Fetch unit 26 generates instruction addresses from the instruction pointer by way of instruction microtranslation lookaside buffer ($\mu$TLB) 22, for application to level 1 instruction cache $16_i$. Fetch unit 26 may be implemented in a conventional manner known in the art, or may include additional functionality useful in branch prediction. Instruction cache $16_i$ produces a stream of instruction data to fetch unit 26, which in turn provides the instruction code to predecode 0 stage 28 and predecode 1 stage 32 in the desired sequence. These two stages operate as separate pipeline stages, and together operate to locate up to three x86 instructions and apply the same to decode unit or decoder 34. Predecode 0 stage 28 determines the size and position of as many as three variable-length x86 instructions, while predecode 1 stage 32 recodes the multi-byte instructions into a fixed-length format to facilitate decoding. Decode unit 34, in this example, contains four instruction decoders, each capable of receiving a fixed length x86 instruction from predecode 1 stage 32 and producing from one to three atomic operations (AOps), which are substantially equivalent to Reduced Instruction Set Computer (RISC) instructions. Scheduler 36 reads up to four AOps from the decode queue at the output of decode unit 34, and assigns these AOps to the appropriate execution units. Operand unit 44 receives an input from scheduler 36 and also from microcode Read Only Memory (ROM) 46, via multiplexer 45, and fetches register operands for use in the execution of the instructions. In addition, according to this example, operand unit 44 also performs operand forwarding to send results to registers that are ready to be stored, and also performs address generation for AOps of the load and store type.

Microsequencer 48 and microcode ROM 46 control ALUs 42 and load/store units 40 in the execution of microcode entry AOps, which are generally the last AOps to execute in a cycle. In this example, microsequencer 48 sequences through microinstructions stored in microcode ROM 46, to effect control responsive to microcoded microinstructions such as complex or rarely-used x86 instructions, x86 instructions that modify segment or control registers, handling of exceptions and interrupts, and multi-cycle instructions (such as REP instructions, and instructions that PUSH and POP all registers).

Microprocessor 10 also includes circuitry 24 for controlling the operation of Boundary-Scan (JTAG) scan testing, and of certain built-in self-test (BIST) functions, ensuring the validity of the operation of microprocessor 10 upon completion of manufacturing, and upon resets and other events.

Figure 2:
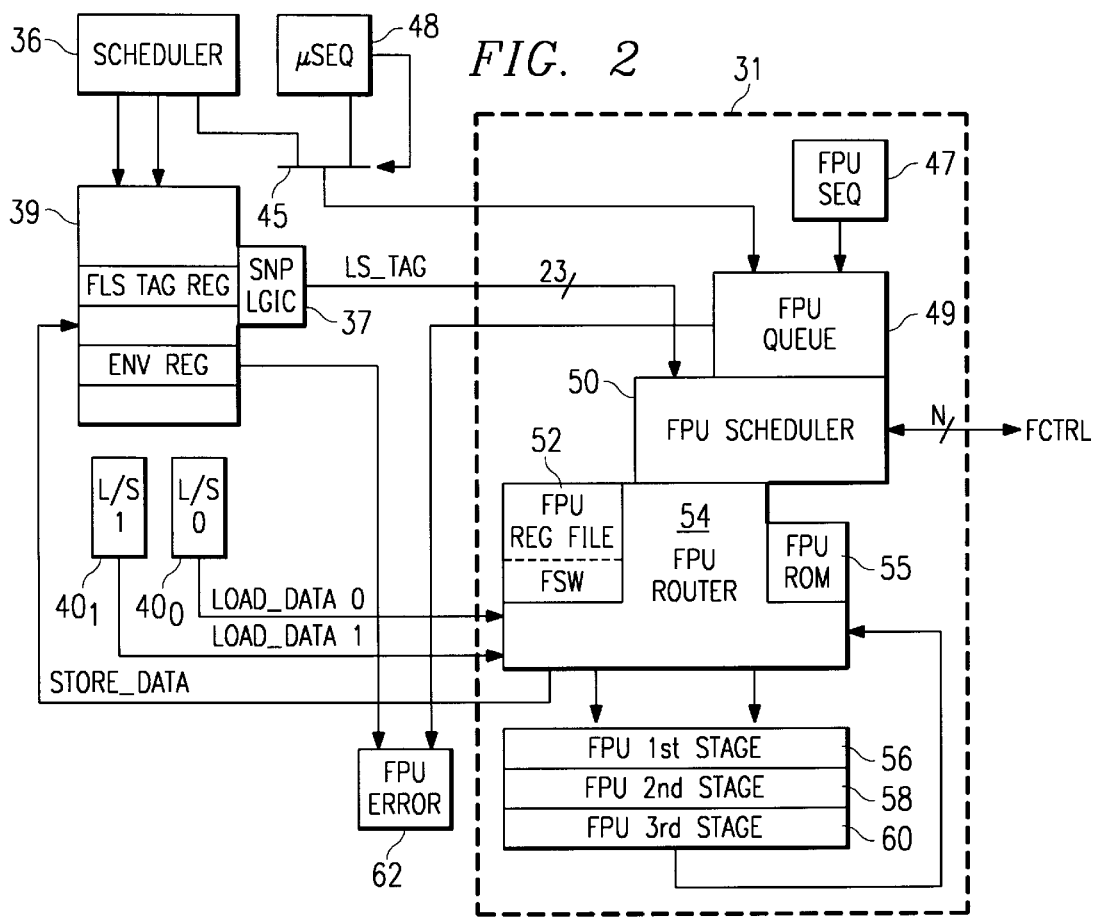
FIG. 2 is an electrical diagram, in block form, of the floating-point unit and support circuitry in the microprocessor of FIG. 1 according to the preferred embodiment of the invention.

Referring now to FIG. 2, the construction of FPU 31 according to this embodiment of the invention, and its interconnection with the other functional blocks of microprocessor 10, will now be described in detail. This construction of FPU 31 is presented by way of example only, as it is to be understood that the present invention will be beneficial in the implementation of floating-point units constructed according to other architectures and designs.

Each of the functional blocks of FPU 31 will be described in individual detail hereinbelow. FPU 31 includes FPU queue stage 49, which is effectively an instruction buffer, between the integer portions of microprocessor 10 and the execution stages of FPU 31. FPU queue stage 49 receives FPU instructions from scheduler 36 or from integer microsequencer 48 (in the case of microcoded instructions), via multiplexer 45 that is under the control of microsequencer 48. FPU queue stage 49 also receives FPU instructions from FPU microsequencer 47, for the execution of microcoded FPU instructions.

FPU queue stage 49 is connected to FPU scheduler 50 which, in this example, performs the scheduling function for floating-point instructions separately from scheduler 36 in the integer portion of microprocessor 10. FPU scheduler 50 is logic that operates in similar fashion as scheduler 36, responsive to instructions forwarded thereto from FPU queue stage 47, and also responsive to address information conveyed thereto from register file 39. Register file 39 includes at least one register FLS TAG, which stores the format of data operands that are to be used by FPU 31. Snoop logic 37 is associated with register file 39 to monitor the pipeline for load/store operations corresponding to floating-point instructions, for example as may be stored in register FLS TAG. Snoop logic 37 encodes certain information corresponding to floating-point load/store directives, and forwards this information to FPU scheduler 50 on bus LS_TAG. In response to the floating-point AOps and to the load/store directives, FPU scheduler 50 issues control signals to the remaining functional blocks of FPU 31 to execute the instructions communicated thereto.

In this example, FPU 31 includes its own register file 52. Registers included within FPU register file 52 include a floating-point status word (FSW), a floating-point control word (FCW), and an eight-register stack (consistent with the x86 instruction set). Floating-point status word FSW, in this example, contains a stack pointer indicating the current top-of-stack value TOP for the register stack in FPU register file 52. According to this embodiment of the invention, where eight registers are present in the stack, both the FPU stack pointer and the register addresses are expressed by a three-bit binary value. The construction and addressing of registers in the stack of register file 52 according to the preferred embodiment of the invention will be described in further detail hereinbelow. The five floating-point environment registers, useful for interrupt handling, are included in integer register file 39 (shown in FIG. 2 as ENV REG), as these registers are not used internally by FPU 31.

FPU router stage 54 operates in conjunction with FPU scheduler 50 to forward the desired operands to the execution stages of FPU 31. FPU router stage 54 receives floating point operands from multiple sources, such sources including load/store units $40_0$, $40_1$ (presenting data on buses LOAD_DATA0, LOAD_DATA1, respectively), floating-point register file 52, constant data ROM 55, and FPU $3^{rd}$ execution stage 60 (which presents writeback data from the results of prior instructions). Constant data ROM 55 stores common floating-point constants (e.g., $\pi$, e, $\sqrt{2}$) that may be used in floating-point instruction execution, particularly in transcendental function evaluation. FPU router stage 54 selects among the various operands for presentation to FPU $1^{st}$ stage 56 for execution.

FPU $1^{st}$, $2^{nd}$, and $3^{rd}$ execution stages 56, 58, 60, respectively, each include conventional arithmetic logic units used in floating-point arithmetic, and each include a status pipeline, a datapath, and a control pipeline. The control pipeline communicates control information regarding the instruction type, rounding mode, precision, exception masks and format control signals, along with the current instruction and operands in the corresponding execution stage. Similarly, the status pipeline uses both the control signals and also the data related information from the data path to generate an instruction status that also travels along with the instruction and operands along the FPU execution pipeline. The data path, including both an exponent pipeline and a mantissa pipeline given the floating-point operation of FPU 31, includes the necessary hardware for performing the arithmetic operations corresponding to the instruction. The output of FPU $3^{rd}$ stage 60 is forwarded back to FPU router 54 for further handling. The datapaths of FPU $1^{st}$, $2^{nd}$, and $3^{rd}$ execution stages 56, 68, 60 will be described in further detail hereinbelow.

Communication of control signals and data to and from FPU 31 is effected in several ways. As noted above, multiplexer 45 forwards floating-point instructions to FPU queue stage 49 from integer scheduler 36 and microsequencer 48, and FPU 31 receives certain information regarding the format of operands from register file 39 on bus LS_TAG. Operands retrieved from memory are also forwarded from load/store units 40 to FPU router 54, as noted above. The results of the floating-point instruction are presented by FPU router 54 to register file 39 on bus STORE_DATA, as shown in FIG. 2. Status information, including identification of denormalized operands and other exceptions are communicated from the floating-point status word (FSW) for each floating-point result for storage in FPU error registers 62, via environment registers ENV in register file 39 and also by FPU queue stage 49. Other control signals, including signals to flush the FPU pipeline and to stall FPU operation, are communicated to and from FPU scheduler 50 by way of FPU control bus FCTRL. The construction of FPU scheduler 50 will be described in further detail hereinbelow.

As is evident from FIG. 2, FPU 31 in this example includes its own scheduler 50, separate and distinct from scheduler 36 for the integer pipeline of microprocessor 10. According to this preferred embodiment of the invention, therefore, the scheduling of atomic floating-point operations (atomic in the RISC sense) is performed by FPU 31 itself, and does not require the involvement of scheduler 36. In effect, each floating-point instruction issued by scheduler 36 is, from the viewpoint of scheduler 36, an atomic operation in the same sense as atomic operations on the integer side. As a result of this architecture, the integer pipeline need not stall or wait for the completion of floating-point instruction execution (as in the case of conventional x86 architecture Complex Isstruction Set Computers (CISC) processors), nor does scheduler 36 become bogged down in the scheduling of both atomic floating-point operations and integer atomic operations, as in the case of conventional RISC processors.

The scheduling operations performed by FPU scheduler 50, FPU queue stage 49, and router 54 in FPU 31 include those operations required to launch floating-point instructions into their execution stages. In this regard, queue stage 49 decodes the atomic floating-point operations received from scheduler 36 into the appropriate control signals, and scheduler 50 applies these control signals to the execution stages in FPU 31, after determining whether the atomic floating-point operations are of the single-cycle, single-pass, or microcoded type, and after identifying and handling any dependencies or hazards caused thereby. Scheduler 50 is also responsible for obtaining and formatting the floating-point operands for launching along with the control signals.

Also according to this preferred embodiment of the invention, scheduler 50 in FPU 31 also handles instruction completion, including writeback and update of machine status. In the event of any exceptions resulting from the execution of a floating-point operation, such as NaN (not a number), overflow, underflow, and the like, scheduler 50 is also responsible for handling the exceptions and reporting the exceptions to the integer pipeline. Scheduler 50 and router 54 also provide an interface with the integer logic, as is necessitated by the distribution of the scheduling function to FPU 31. The update of machine status performed by FPU scheduler 50 includes the generation of a new top-of-stack value TOP to be stored in the stack pointer portion of the floating-point status word FSW.

Figure 3:
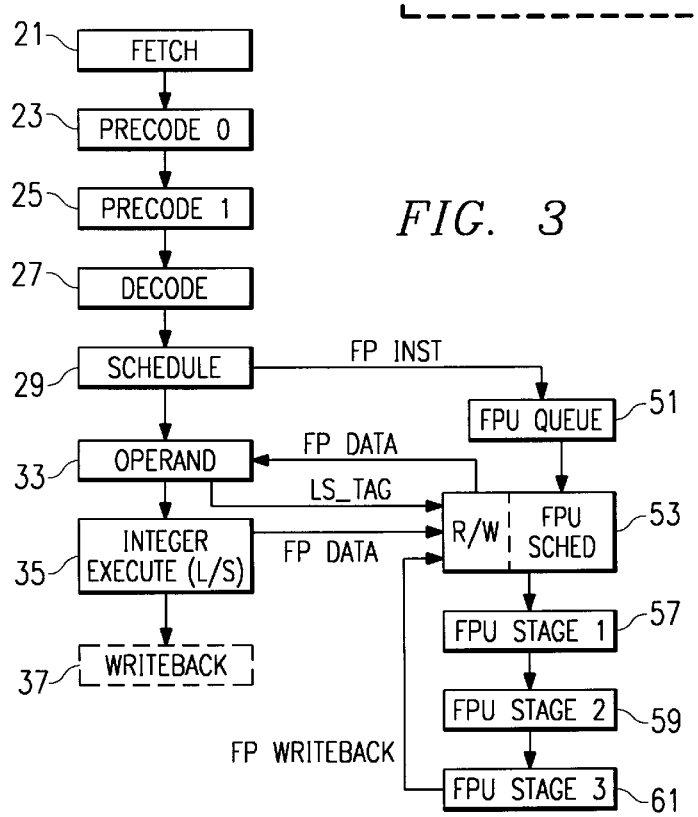
FIG. 3 is a pipeline diagram illustrating the relationship between the floating-point and integer pipelines in the microprocessor of FIG. 1 according to the preferred embodiment of the invention.

Referring now to FIG. 3, the cooperative operation of the integer and floating-point pipelines in microprocessor 10 according to the preferred embodiment of the invention will now be described. As described in detail hereinabove, both integer and floating-point instructions follow a pipeline (or multiple pipelines, considering the superscalar nature of microprocessor 10 according to this embodiment of the invention) beginning with the instruction fetch stage 21, predecode 0 stage 23, predecode 1 stage 25, and instruction decode stage 27; these operations are performed by fetch unit 26, predecode 0 stage 28, predecode 1 stage 32, and decode unit 34, respectively, as described hereinabove. Schedule stage 29 in the pipeline, performed by scheduler 36 as described above, issues non-floating-point instructions as atomic operations (AOps) or as microcoded sequences, each of which pass through the operand (or register) pipeline stage and are executed (including access of load/store units 40) in stage 35. Writeback operations then are performed in pipeline stage 37.

In schedule stage 29, scheduler 36 forwards floating-point instructions to floating point queue pipeline stage 51, in the form of complete atomic instructions (FP INST in FIG. 3). After buffering by floating-point queue 49, these floating-point instructions are then scheduled by FPU scheduler 50 in FPU scheduling pipeline stage 53. Floating-point queue stage 51 is inserted prior to FPU scheduling stage 53 in the FPU pipeline because all memory accesses require two cycles (register access and load/store) in the x86 architecture. FPU queue stage 49 is thus used to perform opcode decoding and other instruction routing functions for a new floating-point instruction prior to its scheduling, given the necessity for the additional cycle for memory access.

Following floating-point queue pipeline stage 51, the floating-point instruction next enters the floating-point schedule pipeline stage 53. As shown in FIG. 3, floating-point schedule stage 53 also includes a read/write stage, which is performed by FPU router 54 simultaneously with the scheduling performed by FPU scheduler 50. In floating-point schedule pipeline stage 53, scheduler 50 checks the instruction for dependencies, fetches the register operand (illustrated by the parallel read/write stage), and prepares the instruction for execution. As in the case of integer scheduling described hereinabove, each floating-point instruction is scheduled as atomic operations, and may be single-cycle atomic instructions, single-pass multi-cycle instructions, or microcode instructions. Examples of single-cycle instructions include register exchange instructions (FXCH) and simple arithmetic instructions such as change sign (FCHS) and absolute value (FABS). Single-pass instructions include arithmetic operations such as multiply, add, subtract, and compare (FMUL, FADD, FSUB, FCOM, respectively). Microcode instructions are typically a sequence of single-pass and single-cycle instructions stored in ROM for performing complex operations such as square-root, transcendental function evaluation and the like.

Figure 4:
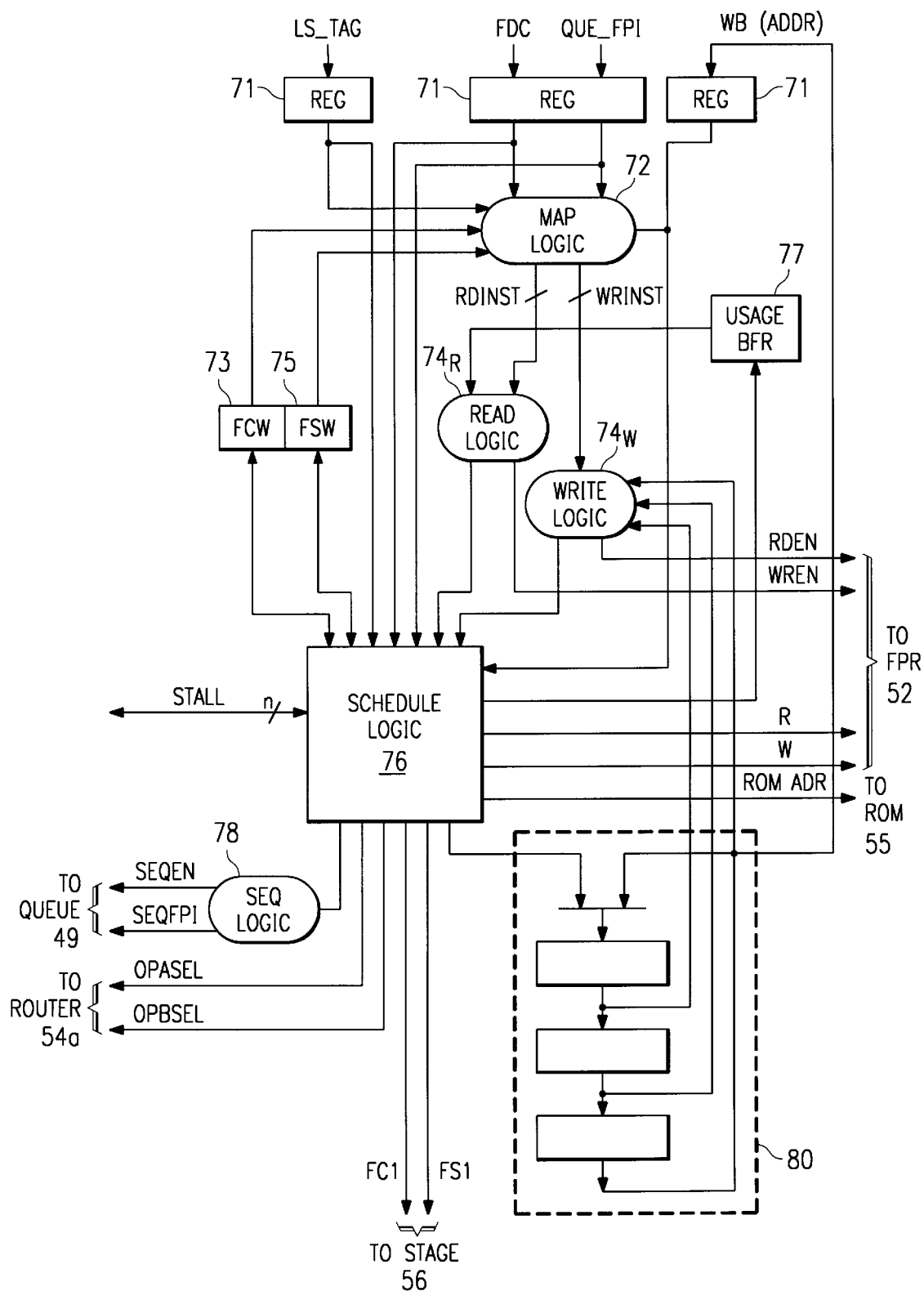
FIG. 4 is an electrical diagram, in block form, of the floating-point scheduler in the microprocessor of FIG. 1 according to the preferred embodiment of the invention.

Referring now to FIG. 4, the construction and operation of FPU scheduler 50 according to the preferred embodiment of the invention will now be described in detail. According to the preferred embodiment of the invention, the function of scheduler 50 is to provide central execution control for each floating-point instruction to be executed by FPU 31. Maximum floating-point performance will be maintained by scheduling a new instruction in each cycle, such that the execution pipeline remains full. In order to approach this goal, resource dependencies and exception hazards are identified and handled by FPU scheduler 50.

According to this preferred embodiment of the invention, FPU scheduler 50 receives instruction control signals and directives from three sources, namely directives from load/store units 40 on lines LS_TAG, decoded control signals and opcodes from FPU queue stage 49 on lines FDC and QUE_FPI, respectively, and address information from writeback bus WB generated by FPU $3^{rd}$ execution stage 60 in response to a single-pass instruction previously launched and executed. Each of these control signals and directives are temporarily held in registers 71 of FPU scheduler 50, the outputs of which are presented both to map logic 72 and schedule logic 76 in FPU scheduler 50.

Map logic 72 is provided to check for dependencies, or pipeline conflicts, among the resources to which the instructions, control signals and directives stored in registers 71 point. Map logic 72 thus consists of logic for extracting relative register addresses from the buffered versions of LS_TAG, FDC, QUE_FPI, and WB. In this embodiment of the invention, one floating-point instruction is scheduled at a time. As such, map logic 72 will analyze only one of the directives stored in registers 71 in any one cycle, according to a priority scheme. In this example, writeback has the highest priority, followed by load/store directives on lines LS_TAG, followed by a new instruction presented on lines FDC and QUE_FPI by queue stage 49. The register addresses for the currently scheduled instruction according to this priority are then extracted by map logic 72, for mapping stack-based register addresses to the raw, or actual, registers of floating-point register file 52.

Map logic 72 further interrogates floating-point status word (FSW) 75 to determine the current top-of-FP-stack pointer value TOP, and maps the resources indicated by the currently scheduled instruction as stored in register 71 to actual, or raw, register addresses of floating-point register file 52, communicating these register addresses to read logic 74R and write logic 74W. The generation of raw register addresses for instruction source and destination operations is necessary in order to detect conflicts, dependencies, and the like. Map logic 72 further extracts the source and destination fields in the instructions and control signals stored in registers 71 to determine the number of read requests and write requests necessary for execution, and communicates these values also to read logic 74R and write logic 74W. The signal lines for carrying the register numbers and numbers of read/write requests from map logic 72 to read logic 74R and write logic 74W are illustrated in FIG. 4 as lines RDINST and WRINST, respectively.

As noted hereinabove, certain instructions executed by FPU 31 involve the calculation of a raw register address from the value TOP that is expected to be current upon execution of the instruction, and from a relative register address explicitly included in the instruction, in a manner that may or may not involve a PUSH operation. In the case where the instruction does not involve a PUSH, a raw register address FSTK is easily calculated as follows:

FSTK=TOP+REG where TOP is the value of the stack pointer, and where REG is the register address indicated in the instruction. Instruction register address REG is, as is well known in stack architecture, a relative address, or offset, indexed from the value TOP in deriving the raw register address. As is known in the art and as noted above, a PUSH operation typically requires the pre-decrementing of the stack pointer prior to the storage of an operand therein. Accordingly, in the case where the instruction involves a PUSH operation, the raw register address FSTK may be easily calculated as follows:

FSTK=TOP+REG-1 where the subtraction is required by the PUSH operation.

The calculation of raw register addresses in such a way as to contemplate a PUSH operation can occur quite often in a pipelined architecture, where a subsequent instruction (in program order) is launched prior to the completion of the execution of a prior instruction, considering that the stack pointer is not updated until the completion of the execution of the prior instruction. If the prior instruction includes a PUSH and the ensuing instruction reads from the top of the stack, the raw register address calculated in the scheduling of the ensuing instruction must anticipate the value of the stack pointer at the time of the completion of the prior instruction, and thus must be calculated in such a way as to account for the PUSH in the prior instruction.

In x86 -nomenclature, the value TOP is indicated by ST(0), or ST, and a relative register address REG is indicated in an x86 instruction by ST(n), where n is the offset from the top of stack value ST(0). Given this nomenclature, a simple example of a sequence of instructions in which a raw register address must be calculated in such a way as to account for a PUSH operation is as follows:

| FLD memory → ST(0) | PUSH contents of memory location into top of stack |
| FADD ST(0),ST(3) → ST(0) | ADD contents of stack registers ST(0), ST(3) and store result in ST(0) |

The PUSH of the FLD instruction, as noted above, requires the pre-decrementing of the stack pointer (to save the prior top of stack location from being overwritten), followed by the storing of the memory location contents at the new top of stack register ST(0). In microprocessor 5 according to the preferred embodiment of the invention, where FPU 31 is pipelined, the scheduling of the FADD instruction will begin prior to the completion of the execution of the FLD instruction. Accordingly, the stack pointer will not have been updated following the PUSH of the FLD instruction at the time that the raw register addresses must be calculated in scheduling the FADD instruction. Scheduler 50 must therefore be capable of deriving the raw register addresses for ST(0) and ST(3) in the FADD instruction in such a way as to account for the PUSH of the FLD instruction.

Referring now to FIG. 5, register addressing circuitry 125 within map logic 72 for calculating raw register addresses according to the preferred embodiment of the invention will now be described in detail, in combination with stack $52_{ST}$ of floating-point register file 52. As described hereinabove, eight registers FSTK, having raw register addresses FSTK[0] through FSTK[7], are contained within the stack $52_{ST}$ in floating-point register file 52. Each of registers FSTK is, in this embodiment of the invention, an eighty-bit register for storing a floating-point operand, including portions corresponding to the mantissa, exponent, and sign bit. Each of registers FSTK is associated with a tag portion T, as shown in FIG. 5, indicating whether its register FSTK is valid, empty, or in a special format.

Because stack $52_{ST}$ contains eight registers FSTK[0] through FSTK[7], floating-point stack pointer FSP is a three-bit register, contained within floating-point status word FSW as described hereinabove. The contents of stack pointer FSP is top-of-stack value TOP indicating which of the eight registers in stack $52_{ST}$ corresponds to the top of stack $52_{ST}$. The contents of stack pointer FSP are presented to register addressing circuitry 125 on bus A. Register addressing circuitry 125 also receives, on bus B, register address value REG from registers 71 for the appropriate instruction source. Register address value REG is also a three-bit value considering that it addresses one of the eight registers in stack $52_{ST}$. As noted above, register address value REG is a relative address using the contents of stack pointer FSP (i.e., the current value TOP) as the index.

Register addressing circuitry 125, according to this embodiment of the invention, includes adder/decrementer 120 and adder 122, in parallel with one another. Each of adder/decrementer 120 and adder 122 receive the contents of stack pointer FSP on bus A and register address REG on bus B. Adder/decrementer 120, as will be described in further detail hereinbelow, generates a three-bit value corresponding to the sum of the binary values on buses A and B nminus one, and presents this value to multiplexer 124 on bus SUM—1; adder 122 generates a three-bit sum corresponding to the sum of the binary values on buses A and B, and presents this value to multiplexer 124 on bus SUM. Accordingly, the output of adder/decrementer 120 corresponds to the calculation of a raw register address FSTK as follows:

FSTK=TOP+REG−1 and the output of adder 122 corresponds to the calculation of a raw register address FSTK as follows:

FSTK=TOP+REG

Multiplexer 124 selects either the output of adder/decrementer 120 or the output of adder 122 as the calculated register address FSTK for the instruction being scheduled, depending upon the signal BORROW presented thereto as a control input. The signal BORROW is generated by other portions of map logic 72 according to the current instruction for which the raw register address is being calculated, depending upon whether or not a PUSH operation is involved. The raw register address may be a source, destination, or temporary register, depending upon the instruction being scheduled.

Adder 122 is a conventional single carry-propagate adder for adding the two three-bit values on buses A and B. The term carry-propagate refers to the type of adder in which carry information propagates within the addition and affects higher-order sum bits. Examples of carry-propagate adders include adders such as carry-ripple adders, carry-lookahead adders, and the like. In this embodiment of the invention, no carry-out bit position is required from adder 122, considering that its purpose is to generate a raw register address FSTK corresponding to one of eight registers in stack $52_{ST}$; as such, the addressing of the registers in stack $52_{ST}$, merely wraps around from address $111_2$ to $000_2$.

Adder/decrementer 120, according to the preferred embodiment of the invention, is a single carry-propagate adder for adding the two three-bit values on buses A and B and subtracting one from the sum. Again, no carry-out is required from the addition, as the addresses in stack $52_{ST}$ wrap around. However, conventional adder designs are not capable of generating the result A+B−1 with a single carry/borrow propagate add. Instead, according to conventional techniques, the result A+B−1 is produced by two carry-propagate (or carry/borrow-propagate) adds, in which the first carry-propagate add computes the sum A+B and the second carry-propagate add subtracts one from the sum A+B (generally by adding the 2's complement of 12). In contrast, adder/decrementer 120 performs the three-bit wrap-around operation of A+B−1 in a single carry/propagate add, specifically in a single carry-ripple add, rather than in two carry/propagate adds as required by conventional techniques. The construction and operation of an example of adder/decrementer 120 according to the preferred embodiment of the invention, in which the result A+B−1 is produced in a single carry-propagate add for the three-bit calculation, will now be described in detail.

According to the preferred embodiment, the sum A+B−1 is generated by including an unconditional borrow-in value of 1 into the generation of the least significant bit position $S_0$ of the sum. This borrow-in of 1 into the least significant bit position ensures that no carry-out bit will enter the generation of the next bit position $S_1$ of the sum; however, a borrow-in value may be generated (in the case of $A_0=B_0=0$). The truth table for the addition of the least significant input bits $A_0$, $B_0$, generating sum bit $S_0$, carry-out $C_{out}$, and borrow-out $B_{out}$, is therefore as follows:

| $A_0$ | $B_0$ | $S_0$ | $C_{out}$ | $B_{out}$ |
|---|---|---|---|---|
| 0 | 0 | 1 | 0 | 1 |
| 0 | 1 | 0 | 0 | 0 |
| 1 | 0 | 0 | 0 | 0 |
| 1 | 1 | 1 | 0 | 0 |

With no possible carry-in bit from the least significant bit positions, the addition of bit positions $A_1$, $B_1$ is therefore according to the following truth table, where $B_{in}$ indicates the state of the $B_{out}$ borrow-out bit from the addition of $A_0$, $B_0$:

| $B_{in}$ | $A_1$ | $B_1$ | $S_1$ | $C_{out}$ | $B_{out}$ |
|---|---|---|---|---|---|
| 0 | 0 | 0 | 0 | 0 | 0 |
| 0 | 0 | 1 | 1 | 0 | 0 |
| 0 | 1 | 0 | 1 | 0 | 0 |
| 0 | 1 | 1 | 0 | 1 | 0 |
| 1 | 0 | 0 | 1 | 0 | 1 |
| 1 | 0 | 1 | 0 | 0 | 0 |
| 1 | 1 | 0 | 0 | 0 | 0 |
| 1 | 1 | 1 | 1 | 0 | 0 |

The addition of bit positions $A_1$, $B_1$ can generate either a borrow-out $B_{out}$ or a carry-out $C_{out}$, corresponding to borrow-in $B_{in}$ and carry-in $C_{in}$ bits to the addition of most significant bit positions $A_2$, $B_2$. It has been discovered, however, in connection with the present invention, that the generation of sum bit $S_2$ is identical in the case where carry-in $C_{in}=1$ and where borrow-in $B_{in}=1$ (of course, both a carry-in and a borrow-in will not be present in any addition). Of course, differences in the carry-out and borrow-out from the addition of bit positions $A_2$, $B_2$ would exist, depending upon whether a carry-in and a borrow-in is received. However, as noted above, stack $52_{ST}$ contains only eight registers in this architecture, and the generation of the raw register address FSTK wraps around from $111_2$ to $000_2$. Accordingly, the carry-out and borrow-out from the addition of bit positions $A_2$, $B_2$ may be ignored, as only the sum bit $S_2$ is useful in the register address. It has been discovered that this greatly simplifies the construction of adder/ decrementer 120 for generating the three-bit add/decrement operation A+B−1. The truth table for the generation of most significant sum bit $S_2$ is therefore expressed as follows:

| $B_{in}, C_{in}$ | $A_2$ | $B_2$ | $S_2$ |
|---|---|---|---|
| 0 | 0 | 0 | 0 |
| 0 | 0 | 1 | 1 |
| 0 | 1 | 0 | 1 |
| 0 | 1 | 1 | 0 |
| 1 | 0 | 0 | 1 |
| 1 | 0 | 1 | 0 |
| 1 | 1 | 0 | 0 |
| 1 | 1 | 1 | 1 |

Given the truth tables indicated above for the generation of sum bits $S_0$, $S_1$, $S_2$, where an unconditional borrow-in is presented into the generation of least significant sum bit $S_0$ and where the borrow-out and carry-out from most significant sum bit $S_2$ are ignored, it has been discovered that adder/decrementer 120 may be constructed that performs the three-bit operation A+B−1 with a single carry/borrow propagate add.

Figure 6:
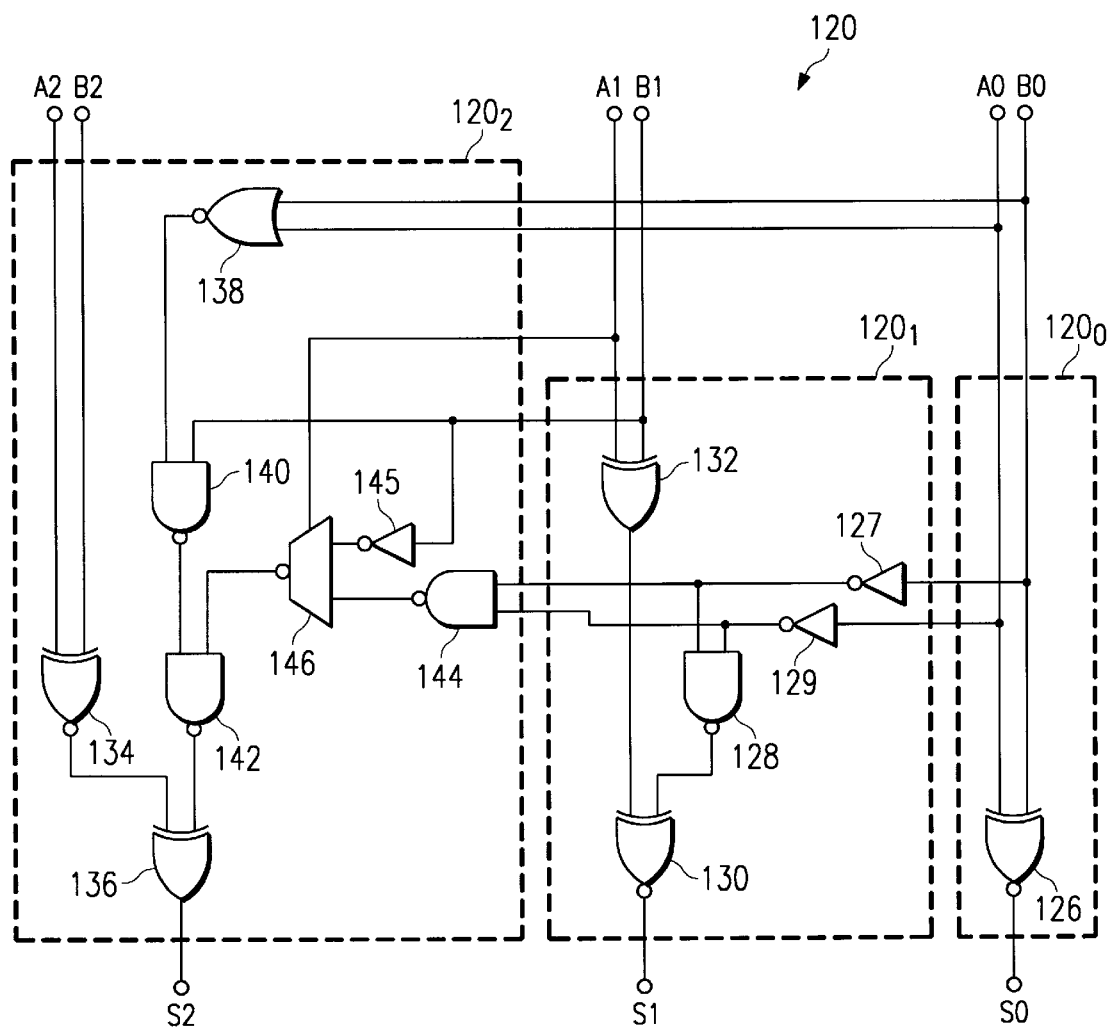
FIG. 6 is an electrical diagram, in schematic form, of an adder/decrementer according to the preferred embodiment of the invention.

Referring now to FIG. 6, the construction of adder/decrementer 120 according to the preferred embodiment of the invention will now be described in detail. The implementation of FIG. 6 according to this embodiment of the invention is presented by way of example only, as it is contemplated that other equivalent realizations (including the possibility of further minimization) of the single carry/borrow propagate three-bit add/decrement function may be derived by one of ordinary skill in the art given this description.

According to the implementation of FIG. 6, adder/decrementer 120 includes a least significant stage $120_0$, which generates sum bit $S_0$. Exclusive NOR gate 126 in stage $120_0$ receives least significant input bits $A_0$, $B_0$, based upon which it generates sum bit $S_0$ as a 1 when input bits $A_0$, $B_0$ are the same, and as a 0 when input bits $A_0$, $B_0$ are different, as indicated in the truth table hereinabove.

In adder/decrementer $120_1$ stage 120, generates sum bit $S_1$. In stage $120_1$, least significant input bits $A_0$, $B_0$ are applied to NAND gate 128, after inversion by inverters 127, 128. The output of NAND gate 128 is therefore low only when least significant input bits $A_0$, $B_0$ are both low, and thus indicates with a high output that no borrow-out $B_{out}$ is generated from the least significant bit positions. The output of NAND gate 128 is applied to one input of exclusive NOR gate 130. The other input of exclusive NOR gate 130 receives the output of exclusive OR gate 132, which receives input bits $A_1$, $B_1$. The output of exclusive OR 132 is high only when input bits $A_1$, $B_1$. differ from one another. Accordingly, sum bit $S_1$ is a 1 responsive to input bits $A_1$, $B_1$ differing from one another in the absence of a borrow-in from least significant bit stage $120_0$ (communicated by NAND 128), and to input bits input bits $A_1$, $B_1$ being the same as one another in the presence of a borrow-in from least significant bit stage $120_0$, and is a 0 otherwise, consistent with the truth table presented hereinabove.

Generation of most significant sum bit $S_2$ by most significant bit stage $120_2$ depends both upon the states of input bits $A_2$, $B_2$ and upon the generation of carry and borrow bits from stage $120_1$. In stage $120_2$, input bits $A_2$, $B_2$ are applied to exclusive NOR gate 134, the output of which is applied to an input of exclusive OR 136. Exclusive OR 136 generates sum bit $S_2$ according to the state of the output of exclusive NOR 134 in combination with the state of the output of NAND gate 142 at its other input. As will be described in detail hereinbelow, the output of NAND gate 142 is high responsive to the absence of both a carry-in and a borrow-in into the most significant bit addition.

In operation, the output of exclusive NOR 134 is high responsive to input bits $A_2$, $B_2$ being the same as one another. Sum bit $S_2$, at the output of exclusive OR 136, is therefore a 1 responsive to input bits $A_2$, $B_2$ differing from one another in the absence of a carry-in or borrow-in from stage $120_1$, and to input bits $A_2$, $B_2$ being the same as one another in the presence of either a carry-in or borrow-in from stage $120_1$, and is a 0 otherwise.

The generation of the carry/borrow absence signal by NAND gate 142 includes some amount of logic minimization in this example. Input bits $A_0$, $B_0$ are received by NOR gate 138, such that its output is high responsive to neither of input bits $A_0$, $B_0$ being high. Since a borrow-in to most significant bit stage $120_2$ can only be generated if a borrow-out is generated by both stage $120_0$ and stage $120_1$, a high logic level at the output of NOR 138 indicates that stage $120_0$ generated a borrow-out, and that therefore a borrow-in to stage $120_2$ is possible. NAND gate 140 receives the output of NOR gate 138 at one input, and receives input bit $B_1$ at its other input. Accordingly, the output of NAND gate 140 indicates to NAND 142, with a high logic level, that a borrow-in to stage $120_2$ is possible because of input bits $A_0$, $B_0$, $B_1$ all being a 0, or that a carry-in to stage $120_2$ is possible because of no borrow-out from stage $120_0$ (either or both of input bits $A_0$, $B_0$ being a 1) in combination with input bit $B_1$ being a 1.

The state of the other input to NAND gate 142 is driven by the output of inverting multiplexer 146, which is controlled by input bit $B_1$. One input to inverting multiplexer 146 is the state of input bit $B_1$ inverted by inverter 145. The other input to inverting multiplexer 146 is generated by NAND gate 144, which receives the inverted states of input bits $A_0$, $B_0$ generated by inverters 127, 129, respectively. As in stage $120_1$, the output of NAND 144 is high if either of input bits $A_0$, $B_0$ is a 1, indicating with this state that no borrow-out from stage $120_0$ is present.

In operation, inverting multiplexer 146 selects the output of NAND 144 when input bit $A_1$ is a 0, and selects the inverted state of input bit $B_1$ when input bit $A_1$ is a 1, and inverts the logic state of its selected input. Accordingly, when input bit $A_1$ is a 0, the output of inverting multiplexer 146 is high if the output of NAND 144 is low, indicating a borrow-out from stage $120_0$; conversely, when input bit $A_1$ is a 1, the output of inverting multiplexer is high if input bit $B_1$ is also a 1, indicating a carry-out from stage $120_1$.

In turn, the output of NAND 142 is low, indicating the presence of either a borrow-in or a carry-in to stage $120_2$, only when both of its inputs from NAND 140 and from inverting multiplexer 146 are high. As described hereinabove, this occurs only when all four of input bits $A_0$, $B_0$, $A_1$, $B_1$ are 0, or when both of input bits $A_1$, $B_1$ are a 1 along with either of input bits $A_0$, $B_0$ being a 1. This operation of NAND 142, in combination with exclusive NOR 134 and exclusive OR 136, generates the appropriate sum bit $S_2$ consistent with the truth table presented hereinabove.

According to the preferred embodiment of the invention, therefore, adder/decrementer 120 generates the three-bit sum A+B−1 with a single carry/borrow propagate add, thus requiring either or both less time or circuit complexity for the calculation of raw register addresses in the instruction scheduling operation. Since instructions requiring the calculation of this value occur with frequency in a critical execution path, it is contemplated that the present invention will provide important performance enhancement to microprocessors incorporating its features.

The above description is provided for the case of three-bit addresses, considering that the generation of the most significant sum bit $S_2$ is identical when either a carry-in or a borrow-in is present, and that the carry-out and borrow-out bits are not used. It is believed that the three-bit case is the largest address size for which this single carry/borrow propagate add/decrement may be performed.

Referring back to FIG. 5, the three sum bits $S_2$, $S_1$, $S_0$ from adder/decrementer 120 are applied to one input of multiplexer 124 on lines SUM−1. The other input of multiplexer 124 receives a three-bit sum of the contents of stack pointer FSP and relative register address REG from adder 122 on lines SUM. Multiplexer 124 selects one of the three bit values, either SUM−1 from adder/decrementer 120 or SUM from adder 122, as the correct raw register address FSTK depending upon the state of line BORROW. Line BORROW is a control signal that is communicated to map logic 72 from the corresponding source of the instruction (i.e., from execution stage 60, from lines LS_TAG, or from lines FDC, QUE_FPI from queue stage 49). Line BORROW indicates whether the instruction currently being scheduled involves a PUSH operation, as indicated by the instruction or operation itself. In the event that the instruction does not involve a PUSH operation, line BORROW will be low, controlling multiplexer 124 to select the output from adder 122 on lines SUM for application to read logic 74R and write logic 74W as raw register address FSTK. Conversely, when the instruction being scheduled does involve a PUSH, line BORROW will be high, causing multiplexer 124 to select the raw register address calculated by adder/decrementer 120 and presented on lines SUM−1, for application to read logic 74R and write logic 74W as raw register address FSTK.

According to the preferred embodiment of the invention, therefore, a single carry/borrow propagate add generates raw register addresses for scheduling and executing instructions in a stack-based architecture processing unit, both where a PUSH is involved and also where a PUSH is not involved. In addition, selection of the proper address may be made after the generation of the addresses, considering that the two addresses (with and without PUSH) are generated in parallel. Accordingly, significant performance improvement may be obtained from the present invention, especially in floating-point unit operation where the register address calculation is performed for many instructions.

Referring briefly to FIG. 7, register addressing circuitry 125' according to an alternative embodiment of the invention will now be described in detail, with like elements referred to by the same reference numerals. As before, register addressing circuitry 125' includes adder/decrementer 120 which generates a value on lines SUM−1 corresponding to the sum of the contents of stack pointer FSP and the relative register address REG, minus one. The output of adder/decrementer 120 is applied to multiplexer 124, which in turn is controlled by line BORROW as before.

According to this alternative embodiment of the invention, adder 122' adds the contents of stack pointer FSP and the relative register address REG, but also receives a signal on line CARRYIN. Line CARRYIN is applied to the least significant bit position of adder 122' in the same manner as a carry-in line in a conventional adder. Accordingly, when line CARRYIN is high, the output of adder 122' is the sum of the contents of stack pointer FSP and the relative register address REG plus one; conversely, when line CARRYIN is low, the output of adder 122' is the sum of the contents of stack pointer FSP and the relative register address REG. As is well known in the art, the addition of two binary values, including a carry-in, may be performed by a single carry-propagate adder, as will be the case with adder 122'.

According to this alternative embodiment of the invention, register addressing circuitry 125' is able to generate a raw register address for instructions that may involve either a PUSH or a POP operation, or neither. In the case of a POP operation, the register address must be incremented by one (typically after the read of the register); adder 122' is thus capable of rapidly generating a raw register address in a manner that accounts for the POP operation. It is to be noted, however, that the frequency with which the POP operation must be accounted in the generation of a raw register address is contemplated to be infrequent, considering that POP operations are typically performed after the read of the operand from the top of the stack. However, the generation of a register address so as to involve a POP may be useful in some situations, for example where a new stack pointer value must be derived for an instruction in an early pipeline stage, for use in the next instruction to be queued or scheduled. In such instances, the alternative embodiment of the invention illustrated in FIG. 7 may be beneficial, as both POP and PUSH operations are contemplated.

Referring back to FIG. 4, read logic 74R and write logic 74W receive the raw register address FSTK from map logic 72, and determine whether dependencies are present, based upon the register addresses calculated by register addressing circuitry 125 and upon the current status of other resources in FPU 31. Pipelock unit 80 is, in this example, a three-stage FIFO that stores the raw destination register addresses for instructions currently being executed by FPU execution stages 56, 58, 60; pipelock unit 80 communicates these raw addresses to write logic 74W for comparison with the raw register addresses calculated by map logic 72. In this exemplary microprocessor, pipelock unit 80 stores the x86id, result destination, and push and pop information for each of the instructions being executed in the three execution stages 56, 58, 60 at the current time, along with execution hazard warning indicators of store-related operations which differ from the behavior of the other instructions. Upon launching of an instruction by schedule logic 76, similar information is loaded into the first stage of the FIFO in pipelock unit 80, with the previously stored information for earlier instructions advancing down the FIFO in order. Each stage of the FIFO in pipelock unit 80 forwards its contents to write logic 74W, for use in detecting conflicts and dependencies.

On the read side, usage register 77 is a mask that indicates the status (empty or full) of the architecture registers in FPU register file 52, with one bit per register. Usage register 77 is loaded by schedule logic 76, and presents its contents to read logic 74R for comparison thereby with the raw register addresses indicated by map logic 72. Based on these inputs, read logic 74R and write logic 74W determine if reads or writes are to be permitted for the current instruction being scheduled, and assert line RDEN and WREN to floating-point register file 52 accordingly to prepare registers therein for possible read or write access, as the case may be.

Schedule logic 76 receives information for new instruction requests and writebacks from read logic 74R, write logic 74W, and from registers 71, and receives information regarding machine status on lines STALL. Based on this information, schedule logic 76 determines which operations to actually launch for execution in the next cycle. In the event that no dependencies are detected and that the currently scheduled instruction includes a read or write to a register in the stack, schedule logic 76 issues commands on lines R, W to floating-point register file 52 to validate the enable signals on lines RDEN, WREN previously issued, according to the instruction being scheduled. Schedule logic 76 also generates signals on lines OPASEL, OPBSEL to FPU router 54 to select the appropriate operands for forwarding to FPU $1^{st}$ execution stage 56 according to the instruction being scheduled. Also depending upon the instruction, schedule logic 76 may initiate a floating-point microcoded instruction by signaling sequencer logic 78, which in turn issues the responsible floating point instruction and a corresponding microcode entry address on lines SEQFPI to queue stage 49, along with an enable signal or code on lines SEQEN which will initiate the microcode routine from the entry address so that the next sequence of instructions will be generated from FPU sequencer 47 in microcode. Finally, single-pass instructions are initiated by schedule logic 76 by control signals on lines FC1, FS1 to FPU $1^{st}$ execution stage 56. Write instructions also cause schedule logic 76 to forward a new entry to pipelock logic 80 so that dependencies in subsequent instructions may be detected.

In normal operation, where no conflicts or dependencies are detected, a new floating-point instruction will advance through FPU scheduler 50 on every cycle. In the event that a dependency is detected in an instruction being scheduled by FPU scheduler 50, schedule logic 76 will stall the pipeline, indicating the same on lines STALL to other logic in FPU 31 and in the integer pipeline. The instruction being scheduled at the time of a stall will not proceed, and will be held up until the dependency or exception clears (as indicated, for example, by completion of the execution of an earlier instruction and clearing of its entry in pipelock logic 80 or in usage register 77); alternatively, techniques such as register renaming may be used to clear the conflict or dependency. In the event of a conflict that causes the execution of an earlier instruction to not complete in normal fashion (e.g., prior to execution of an instruction upon a denormal operand, or execution resulting in not-a-number NaN), FPU scheduler 50 will issue an abort sequence (also communicated, for example, on lines STALL), in which case the instructions currently in the floating-point pipeline will be flushed, and the floating-point sequence will be restarted.

Referring back to FIG. 3, once scheduling pipeline stage 53 is complete, the floating-point instructions are executed in three successive execution pipeline stages 57, 59, 61. The results of FPU $3^{rd}$ stage 61 are then returned to parallel read/write pipeline stage 53 for forwarding into the integer pipeline, as shown in FIG. 3.

Figure 8:
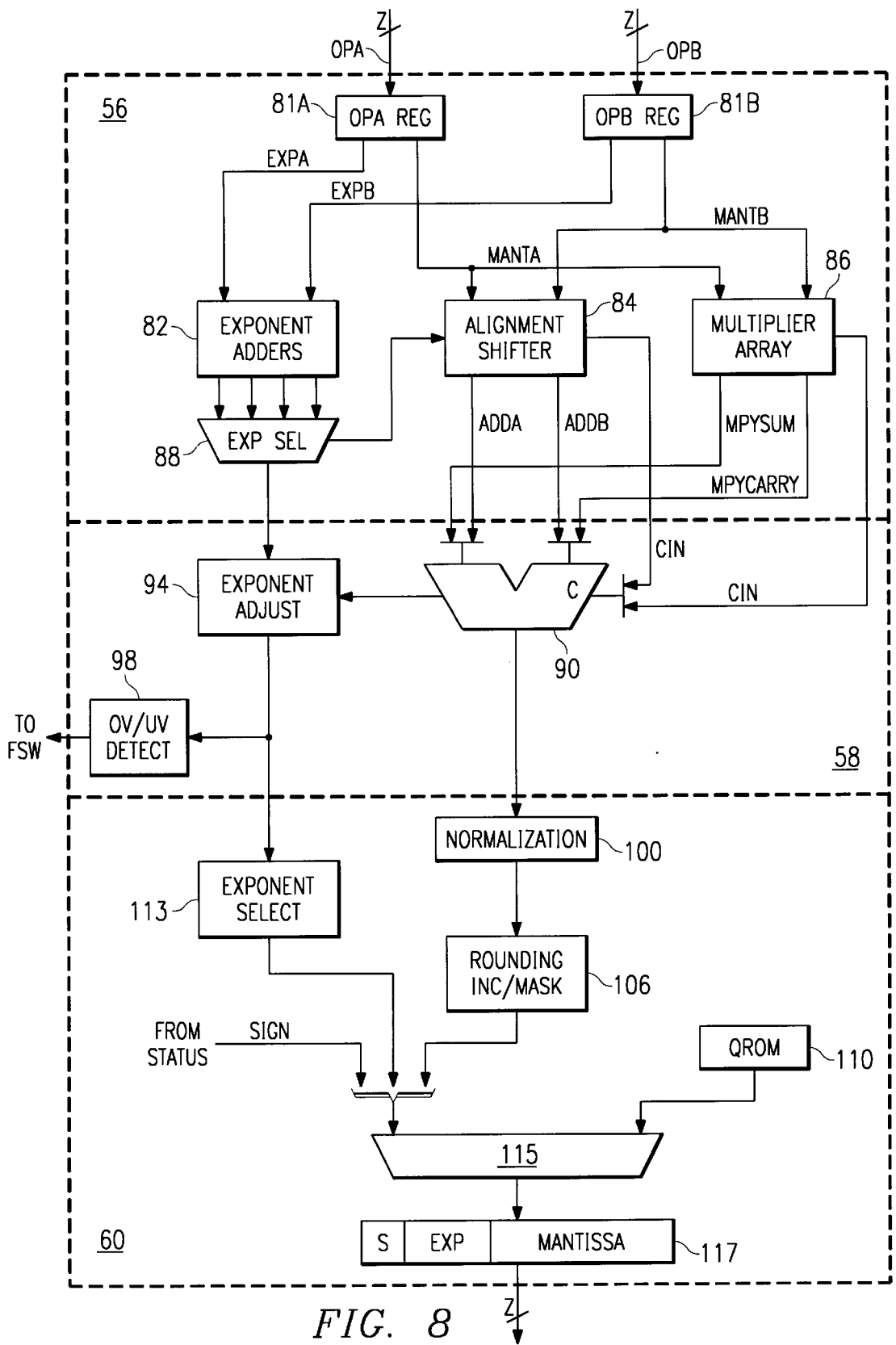
FIG. 8 is an electrical diagram, in block form, of the execution stages of the floating-point unit in the microprocessor of FIG. 1 according to the preferred embodiment of the invention.

Referring now to FIG. 8, the datapaths of FPU $1^{st}$, $2^{nd}$, and $3^{rd}$ execution stages 56, 58, 60 will now be described. As noted above, each of execution stages 56, 58, 60 also include control and status pipelines, along which control signals and status information travel in conjunction with the operands in the corresponding datapath.

FIG. 8 illustrates the construction of the datapath portion of FPU $1^{st}$ execution stage 56 according to this preferred embodiment of the invention. Operands OPA and OPB are received from router 54 and stored in registers 81A, 81B, respectively. In this embodiment of the invention, FPU $1^{st}$ execution stage 56 includes three datapaths; one datapath handles the exponents of floating-point operands OPA and OPB, a second datapath aligns the mantissas of operands OPA and OPB for add and subtract instructions, and a third datapath multiplies operands OPA and OPB for multiply and divide instructions. As such, exponent adders 82 in FPU $1^{st}$ execution stage 56 receive exponent portions EXPA, EXPB of operands OPA, OPB, respectively, and generate the four results EXPA+EXPB−bias, used in multiplication; EXPA−EXPB+bias, used in division; and the results EXPB−EXPA and EXPA−EXPB used in floating-point adds and subtracts. Exponent selector 88 selects from among the four exponent adder results, under the control of a control signal from FPU scheduler 50, as generated for the current instruction. The output of exponent selector 88 produces an exponent value that is forwarded to FPU $2^{nd}$ execution stage 58; these, and the others of, outputs from FPU $1^{st}$ execution stage 56 are typically registered outputs for purposes of stability (the registers not shown in FIG. 8 for clarity).

The addition datapath in FPU $1^{st}$ execution stage 56 includes a conventional alignment shifter 84 that shifts the mantissas of the operands (applied thereto on lines MANTA and MANTB), as required by additive instructions such as floating-point adds and subtracts and by a shift count indicated by exponent selector 88, based upon the greater of the results EXPA−EXPB or EXPB−EXPA. The outputs of alignment shifter 84 on lines ADDA, ADDB, CIN (carry in), and a sticky bit (not shown) are applied to FPU $2^{nd}$ execution stage 58. As is conventional in the art, the sticky bit is the logical OR of the bits shifted out of the end of alignment shifter 84, and is used in rounding. Other conventional floating-point add hardware, such as a mantissa comparator to compute the sign of the result in effective subtraction events or to determine the larger of two NaN operands, and the like, may also be provided in combination with alignment shifter 84. The multiplication datapath in FPU $1^{st}$ execution stage 56 includes a conventional multiplier array 86, including a conventional Booth recoder (not shown) if desired; lines MANTA, MANTB are received by multiplier array 86, which provides outputs on lines MPYSUM, MPYCARRY, CIN, and a sticky bit (not shown) to FPU $2^{nd}$ execution stage 58, as is conventional in the art for floating-point multipliers.

Additionally, FPU $1^{st}$ execution stage 56 includes logic (not shown) for recognizing the exceptions of denormalized operands, and of special operands such as zero, infinity, NaN, and the like, when presented as input operands OPA, OPB. This recognition is performed at the input stage because execution stages 56, 58, 60 in FPU 31 are arranged to only operate on normalized operands, according to this embodiment of the invention. Typically, these input exceptions will be handled by FPU $1^{st}$ execution stage 56 issuing a floating-point sequencer request to FPU microsequencer 47. The input operands will then be reformatted by operation of execution stages 56, 58, 60 executing a microcode sequence called from FPU mnicrosequencer 47. Subsequent instructions in floating-point queue and schedule stages 51, 53 will be aborted until the input exception is handled.

FPU $2^{nd}$ execution stage 58 includes exponent adjust circuit 94, including preferably a conventional leading bit estimator circuit to derive an exponent shift count that estimates the position of the leading bit of the result for forwarding to normalization circuit 100 in the mantissa data path of FPU $3^{rd}$ execution stage 60. The exponent value may also be incremented or decremented in exponent adjust circuit 94, and applied to FPU $3^{rd}$ execution stage 60. In addition, the exponent value output from exponent adjust circuit is also forwarded to over/underflow detector 98, which generates underflow and overflow flags in floating-point status word FSW in the event of an exception. The mantissas for the add and multiply cases are presented to adder 90 by way of multiplexers controlled by a control signal from the control pipeline (not shown) according to whether an add or multiply instruction is being executed.

Adder 90, which is a conventional adder of the carry-propagate (CPA) type, receives the mantissa results from FPU $1^{st}$ execution stage 56, and also a selected carry-in input. The result of the addition by adder 90 is presented to normalization circuit 100 in FPU $3^{rd}$ execution stage 60. The sticky bits are also forwarded to rounding circuitry in FPU $3^{rd}$ execution stage 60.

In FPU $3^{rd}$ execution stage 60, normalization circuit 100 receives a shift count from FPU $2^{nd}$ execution stage 58, and shifts the result of adder 90 by the shift count indicated, and also performs a fine shift as required. FPU $3^{rd}$ execution stage 60 also includes rounding circuitry 106 that increments the normalized mantissa in order to calculate a rounded up value using one of several previously stored roundup entries, selected according to the precision mode for the instruction being executed. An appropriate rounding mask corresponding to a precision mode is also combined with the normalized mantissa (both with and without incrementing), with the appropriate value selected and applied as the mantissa result to result selector 115, under the control of a roundup signal from combinational logic that analyzes the states of the sign bit, least significant bit (LSB), guard bit, round bit, and sticky bit of the mantissa to determine whether the normalized mantissa is to be rounded.

The appropriate exponent value from FPU $2^{nd}$ execution stage 58 is presented to multiplexer 115, as determined by the current operation and the values of the operands themselves. The sign bit is forwarded from the parallel floating-point status pipeline (not shown) directly to the sign bit location in result register 117.

As shown in FIG. 8, FPU $3^{rd}$ execution stage 60 also includes quick ROM (QROM) 110, which stores certain constants, such as indefinite QNaN, zero, infinity (±), π and common fractions of π, and the largest representable number in each available precision format, that are often used in floating-point operations either as the result of an operation or in the event of an exception. These constants are accessed by address values generated by FPU $1^{st}$ execution stage 56. Result selector 115 selects from between the calculated mantissa, sign, and exponent values and the output of quick ROM 110 for storing the results in result register 117 depending upon the result of the instruction (i.e., whether or not an exception occurred). The contents of result register 117 are forwarded on writeback bus WB to FPU router 54 as discussed above relative to FIG. 2, for storage in the destination register address determined by register addressing circuitry 125 in map logic 72 according to the preferred embodiment of the invention (renamed if necessary to avoid conflicts and dependencies). With completion of the operations of FPU $3^{rd}$ execution stage 60, one pass in the performance of a floating-point instruction is complete.

According to the preferred embodiment of the invention, the calculation of register addresses in a stack-based architecture is facilitated, particularly in the case where a PUSH operation is involved. The ability to rapidly calculate register addresses, including subtraction by one, provided by the preferred embodiment of the invention, greatly facilitates the scheduling and register mapping in the performance of stack-based processing units, such as the floating-point unit in x86 -architecture microprocessors. The overall performance of the microprocessor incorporating the present invention is therefore improved relative to conventional architectures.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A circuit for generating a register address, comprising:
    an adder, receiving an index at one input and receiving an offset at another input, for presenting the sum of the index and the offset at its output;
    an adder/decrementer, receiving the index at one input and receiving the offset at another input, for presenting the sum of the index and the offset minus one at its output; and
    a selection circuit, having inputs receiving the output of the adder and the adder/decrementer, having a control input for receiving a select signal, for selecting either the output of the adder or the output of the adder/decrementer as a register address responsive to the select signal received at its control input.

2. The circuit of claim 1, wherein each of the index, offset, and register address are three-bit binary values.

3. The circuit of claim 2, wherein the register address corresponds to one of a plurality of registers in a stack;
    wherein the index is a three-bit value indicating one of the plurality of registers as a top of the stack;
    and further comprising:
    a stack pointer, coupled to the adder and to the adder/decrementer, for storing the index.

4. The circuit of claim 2, wherein the adder/decrementer comprises a single carry/borrow propagate adder.

5. The circuit of claim 2, wherein the adder/decrementer comprises:
    a first stage, for generating a first sum bit as a sum of the least significant bit of the index and the least significant bit of the offset minus one, and for generating a borrow-out bit;
    a a second stage, for generating a second sum bit as a sum of the second bit of the index, the second bit of the offset, and the borrow-out bit from the first stage;
    a third stage, for generating a third sum bit as the sum of the most significant bit of the index, the most significant bit of the offset, and carry-out and borrow-out bits from the second stage.

6. The circuit of claim 2, wherein the adder has a carry-in input, for receiving a carry-in signal.

7. A microprocessor, comprising:
    a processing unit, for executing data processing instructions;
    a plurality of registers, coupled to the processing unit, for storing data operands and arranged in a stack;
    a stack pointer, for storing a top-of-stack address indicating which of the plurality of registers corresponds to a top of the stack; and
    a circuit for generating a register address indicating one of the plurality of registers in the stack, comprising:
    an adder for receiving the top-of-stack address at one input and receiving an offset from an instruction at another input, and for presenting the sum of the index and the offset at its output;
    an adder/decrementer, receiving the top-of-stack address at one input and receiving the offset at another input, for presenting the sum of the index and the offset minus one at its output; and
    a selection circuit, having inputs receiving the output of the adder and the adder/decrementer, for selecting the output of the adder/decrementer as a register address responsive to the instruction involving a push operation to the stack, and for selecting the output of the adder as the register address responsive to the instruction not involving a push operation to the stack.

8. The microprocessor of claim 7, wherein each of the top-of-stack address, offset, and register address are three-bit binary values.

9. The microprocessor of claim 8, wherein eight of the plurality of registers are arranged in the stack.

10. The microprocessor of claim 8, wherein the adder/decrementer comprises a single carry/borrow propagate adder.

11. The microprocessor of claim 8, wherein the adder/decrementer comprises:

a first stage, for generating a first sum bit as a sum of the least significant bit of the top-of-stack address and the least significant bit of the offset minus one, and for generating a borrow-out bit;

a second stage, for generating a second sum bit as a sum of the second bit of the top-of-stack address, the second bit of the offset, and the borrow-out bit from the first stage;

a third stage, for generating a third sum bit as the sum of the most significant bit of the top-of-stack address, the most significant bit of the offset, and carry-out and borrow-out bits from the second stage.

12. The microprocessor of claim 8, wherein the adder has a carry-in input, for receiving a carry-in signal.

13. The microprocessor of claim 12, wherein the adder generates the sum of the top-of-stack address and offset plus one responsive to the instruction involving a pop operation to the stack, and wherein the adder generates the sum of the top-of-stack address and offset responsive to the instruction not involving a pop operation to the stack.

14. The microprocessor of claim 7, wherein the processing unit comprises a floating-point unit;

and wherein each of the plurality of registers is for storing a floating-point operand.

15. The microprocessor of claim 14, further comprising:

an integer pipeline, for executing data processing operations upon integer operands.

16. The microprocessor of claim 15, further comprising:

a bus interface unit, coupled on one side to the processing unit, and coupled on the other side to an external bus.

17. A method of operating a microprocessor, comprising the steps of:

storing a top-of-stack address in a stack pointer, the top-of-stack address indicating one of a plurality of registers arranged in a stack;

receiving a relative register address in an instruction corresponding to an operand for the instruction;

generating, with an adder, the sum of the top-of-stack address and the relative register address;

generating, with an adder/decrementer, the sum of the top-of-stack address and the relative register address minus one; and selecting as a register address responsive to the instruction not involving a push operation, and selecting the sum of the top-of-stack address and the relative register address as the register address.

18. The method of claim 17, further comprising:

comparing the register address with register addresses for earlier instructions, to detect dependencies in the microprocessor.

19. The method of claim 17, wherein the step of generating, with an adder, the sum of the top-of-stack address and the relative register address comprises:

receiving a carry-in signal indicating whether the instruction involves a pop operation to the stack;

adding the top-of-stack address, the relative register address, and the carry-in signal.

20. The method of claim 17, wherein each of the top-of-stack address, the relative register address, and the register address, are three-bit binary values.

21. The method of claim 20, wherein the step of generating, with an adder/decrementer, the sum of the top-of-stack address and the relative register address minus one comprises:

performing a single carry/borrow propagate add.

22. The method of claim 20, wherein the step of generating, with an adder/decrementer, the sum of the top-of-stack address and the relative register address minus one comprises:

generating a first sum bit as the sum of the least significant bit of the top-of-stack address and the least significant bit of the relative register address, assuming a borrow-in;

generating a first borrow-out bit based upon the least significant bit of the top-of-stack address and the least significant bit of the relative register address, assuming a borrow-in;

generating a second sum bit as the sum of the second bit of the top-of-stack address, the second bit of the relative register address, and the first borrow-out bit;

generating a third sum bit as the sum of the most significant bit of the top-of-stack address, the most significant bit of the relative register address, and a logic signal generated from the least significant and second bits of the top-of-stack address and the relative register address.

* * * * *